(No Model.)
C. AULTMAN.
VALVE GEAR.
No. 263,301. Patented Aug. 29, 1882.
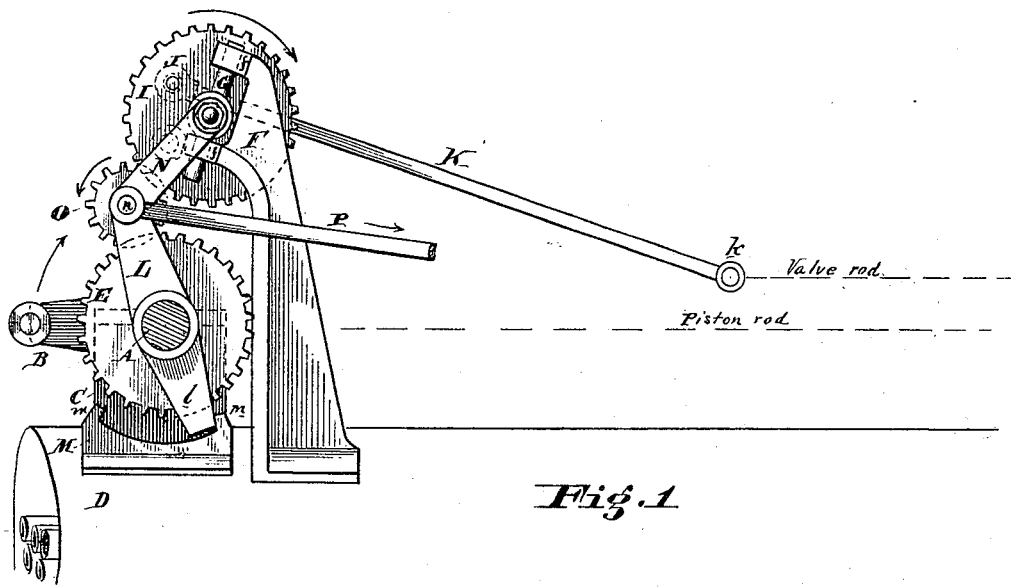
Fig. 1
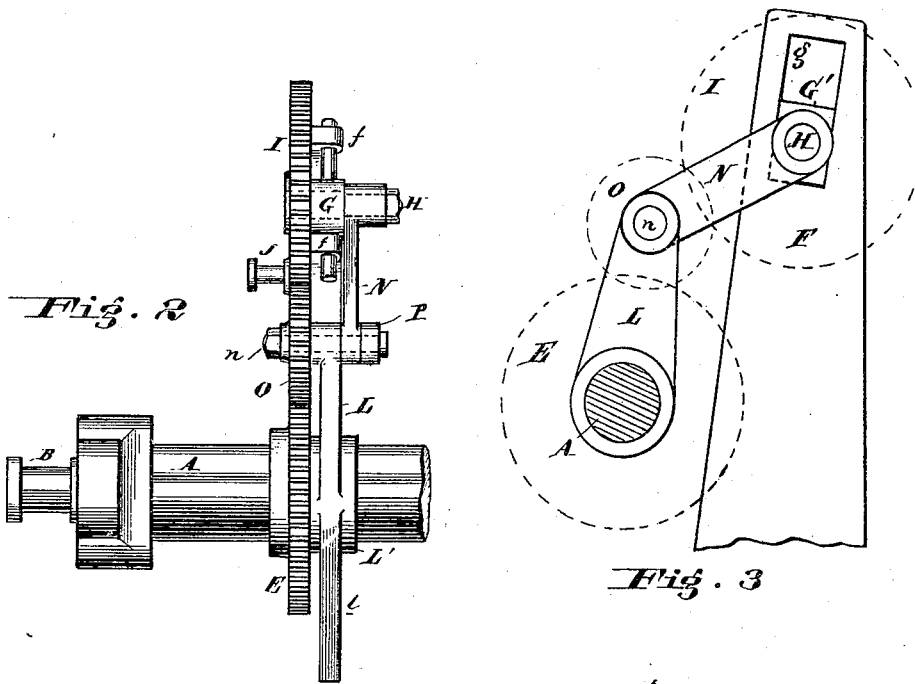
Fig. 2
Fig. 3
Attests
Davis
L. J. Matos.
Inventor
Cornelius Aultman
By his atty.

UNITED STATES PATENT OFFICE.

CORNELIUS AULTMAN, OF CANTON, OHIO.

VALVE-GEAR.

SPECIFICATION forming part of Letters Patent No. 263,301, dated August 29, 1882.

Application filed May 1, 1882. (No model.)

*To all whom it may concern:*

Be it known that I, CORNELIUS AULTMAN, of the city of Canton, county of Stark, and State of Ohio, have invented an Improvement in Valve-Gear for Engines, of which the following is a specification.

My invention has reference to valve-gear for engines; and it consists in securing upon the engine-shaft a spur-wheel of any desired diameter or number of teeth, and causing it to rotate another spur-wheel of equal diameter, upon which the eccentric or crank pin of the valve-rod is secured by means of an intermediate pinion or spur-wheel which is arranged to be moved around the two spur-wheels of equal diameter, one of said spur-wheels being arranged to move to or from the other, but is never in contact with it; further, in details of construction, all of which are fully set forth in the following specification, and shown in the accompanying drawings, which form part thereof.

The object of my invention is to provide an engine with suitable cheap gear by which it may be reversed while running, brought to rest without shutting off the steam, or may vary its cut-off.

In the drawings, Figure 1 is a side elevation of valve-gearing embodying my invention. Fig. 2 is a front elevation of same; and Fig. 3 is a skeleton view, showing a modification of sliding bearing for the moving spur-wheel.

A is the engine-shaft.

B is the crank.

C is the bearing.

D represents a portion of a boiler when the engine is secured thereto, as is the case with portable engines.

E is a spur-wheel of any size or number of teeth, and is secured firmly to shaft A.

F is a support or pedestal secured to the boiler or bed-plate of the engine, and carries at its top bearings $f$, in which guides G work, preferably in a line radiating from the center of shaft A and spur-wheel E. To the guide is secured a hub, through which a pin or short shaft, H, works, said shaft carrying on its end a spur-wheel, I, of the same size and number of teeth as spur-wheel E, and in the same plane; and this spur-wheel is provided with the crank or eccentric pin J for the valve-rod K. The spur-wheels do not touch each other, and are made to rotate in the same direction by an intermediate pinion or spur-wheel, O.

Loosely hinged or journaled to the shaft A by hub L' is an arm, L, which carries a pin or stud, $n$, on its end, said stud supporting and carrying the intermediate wheel, O.

Connecting the pin or stud $n$ and shaft H is a link or arm, N, and to the former is also secured the reversing-rod F. This link N and arm L form a toggle-joint, which, when moved by the rod F, causes the intermediate gear-wheel, O, to travel around both the spur-wheels E and I, the latter moving away from the former as the intermediate wheel, O, approaches a line joining the centers of said spur-wheels E and I from either direction.

The arm L may be provided with an extension, $l$, which moves between stops $m$ on plate M, to control the movement of the arm L, which movement is just sufficient to reverse the engine.

The rod F may be operated by a lever or any of the well-known contrivances used for this purpose.

It is preferable to make the guide G in the arc described from the valve-rod joint $k$ when the crank-pin J is at ninety degrees, so that as the spur-wheel I is moved away from the spur-wheel E by intermediate wheel, O, the valve will not be moved unless said wheels rotate.

In place of the guide $f$ G, shown in Fig. 1, the frame F may be provided with a straight or curved slot, $g$, in which a block, G', slides, said block forming the bearing for shaft H.

The wheel I may be arranged in any desired position about wheel E and shaft A.

As shown in Fig. 1, the engine is working backward, as indicated by the arrows. To reverse it the rod F is drawn back until arrested by the stop $m$. This will change the relative positions of the spur-wheels E I, and consequently the crank-pin J of the valve-rod, with respect to the crank B. If the intermediate wheel is moved only one-half way, the engine is brought to rest, and by a still less movement the cut-off may be changed.

Having now described my invention, what I claim as new, and desire to secure by Letters Patent, is—

1. Valve-gear for engines, consisting of two spur-wheels of equal diameter, one of which is secured rigidly to the driving-shaft of the engine, and the other adapted to move to and from the former, and provided with a crank-pin for the valve-rod, in combination with an intermediate gear arranged to be moved about said spur-wheels, and at all times meshing with them, to change the position of the valve-rod crank-pin with respect to the engine-crank.

2. In valve-gear for engines, the combination of shaft A, carrying spur-wheel E, frame or support F, provided with guiding mechanism, spur-wheel I, having valve-rod crank-pin J, and being of the same diameter as spur-wheel E, intermediate gear, O, toggle-joint N L, and bar F, substantially as described.

3. In valve-gear for engines, the combination of shaft A, carrying spur-wheel E, frame or support F, provided with guiding mechanism, spur-wheel I, having valve-rod crank-pin J, and of same diameter as spur-wheel E, intermediate gear, O, toggle-joint N L, bar F, and means to control the extent of movement of said toggle-joint, substantially as set forth.

In testimony of which invention I hereunto set my hand.

CORNELIUS AULTMAN.

Witnesses:
R. M. HUNTER,
WESLEY WILLIAMS.